(12) United States Patent
Neumann et al.

(10) Patent No.: US 9,199,619 B2
(45) Date of Patent: Dec. 1, 2015

(54) ASSEMBLY MADE OF A COMPENSATING TANK AND A MASTER CYLINDER FOR A HYDRAULIC MOTOR VEHICLE BRAKE SYSTEM

(75) Inventors: Hans-Jürgen Neumann, Rüsselsheim (DE); Peter Tandler, Kronberg/Ts. (DE); Stephan Schlicht, Nauheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 980 days.

(21) Appl. No.: 13/384,851

(22) PCT Filed: Jul. 1, 2010

(86) PCT No.: PCT/EP2010/059349
§ 371 (c)(1),
(2), (4) Date: Feb. 11, 2013

(87) PCT Pub. No.: WO2011/012398
PCT Pub. Date: Feb. 3, 2011

(65) Prior Publication Data
US 2013/0152579 A1    Jun. 20, 2013

(30) Foreign Application Priority Data
Jul. 27, 2009   (DE) .......................... 10 2009 034 626

(51) Int. Cl.
*B60T 11/26* (2006.01)
*B60T 11/22* (2006.01)
(Continued)

(52) U.S. Cl.
CPC ................ *B60T 11/22* (2013.01); *B60T 11/26* (2013.01); *B60T 17/06* (2013.01); *F16B 13/0816* (2013.01); *F16B 5/0642* (2013.01); *F16B 21/086* (2013.01)

(58) Field of Classification Search
CPC ......... B60T 11/22; B60T 11/26; B60T 17/06; F16B 13/0816; F16B 13/0866
USPC ........................................................... 60/585
See application file for complete search history.

(56) References Cited

U.S. PATENT DOCUMENTS 2,927,497 A      3/1960   Rapata
3,518,915 A *    7/1970   Gutshall ..................... 411/39
(Continued)

FOREIGN PATENT DOCUMENTS

DE           19921195 A1    12/1999
DE           10047325 A1    4/2002
(Continued)

OTHER PUBLICATIONS

Application Serial No. PCT/EP2010/059349, International Search Report and Written Opinion mailed Jan. 26, 2011, 10 pgs.
(Continued)

*Primary Examiner* — Michael Leslie
(74) *Attorney, Agent, or Firm* — RatnerPrestia

(57) ABSTRACT

The invention relates to an assembly made of a compensating tank and a master cylinder for a hydraulic motor vehicle brake system, wherein the compensating tank has two fastening attachments, each with an opening, wherein openings align with an opening in the master cylinder, and the compensating tank is fastened by a detachable connection by a fastening pin that extends through the aligned openings. In order to improve the installation and possible dismantling of the fastening pin, and at the same time to maintain an optimized assembly weight, the invention proposes that the fastening pin be made of plastic and interact in a positive- or force-locking manner with at least one of the openings of the fastening attachments.

15 Claims, 2 Drawing Sheets

(51) Int. Cl.
  *F16B 13/08* (2006.01)
  *B60T 17/06* (2006.01)
  *F16B 5/06* (2006.01)
  *F16B 21/08* (2006.01)

(56) References Cited

U.S. PATENT DOCUMENTS

| | | | | |
|---|---|---|---|---|
| 5,031,405 | A | * | 7/1991 | Takahashi et al. ............. 60/585 |
| 5,946,914 | A | | 9/1999 | Crumb et al. |
| 7,441,408 | B2 | * | 10/2008 | Bourlon et al. ............... 60/585 |
| 2011/0308246 | A1 | * | 12/2011 | Neumann et al. ............. 60/585 |

FOREIGN PATENT DOCUMENTS

| | | |
|---|---|---|
| DE | 10 2007 041 500 A1 | 3/2009 |
| EP | 0994262 A2 | 4/2000 |
| JP | S 55142367 U | 10/1980 |
| JP | 08-312613 A | 11/1996 |
| JP | 09-286318 A | 11/1997 |
| JP | 2001-263320 | 9/2001 |
| JP | 2002-139014 | 5/2002 |
| JP | 2003-335236 A | 11/2003 |

OTHER PUBLICATIONS

First Office Action for Patent Application No. 2012-522064 mailed Feb. 25, 2014.

* cited by examiner

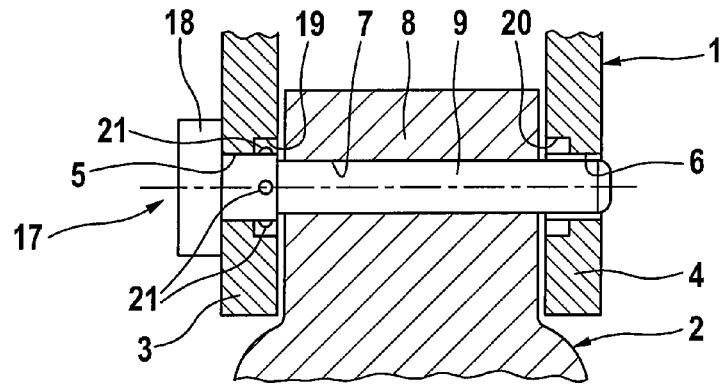
Fig. 1
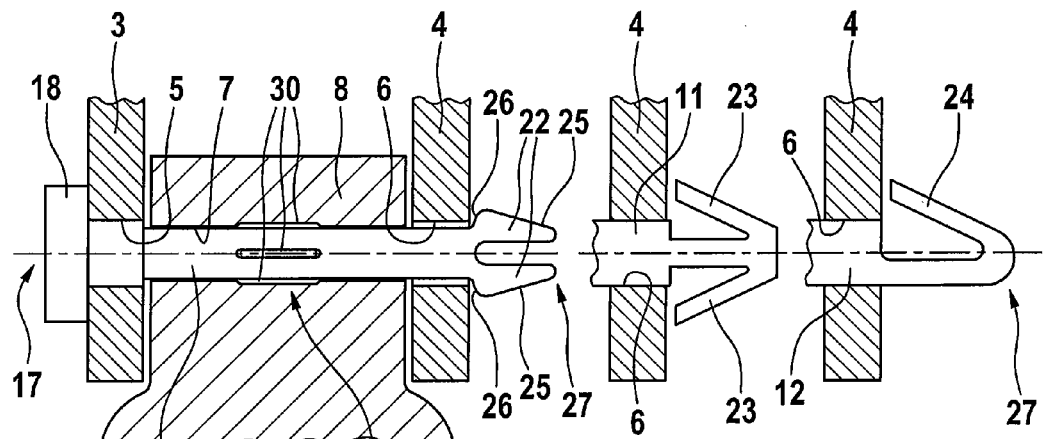
Fig. 2  Fig. 3  Fig. 4
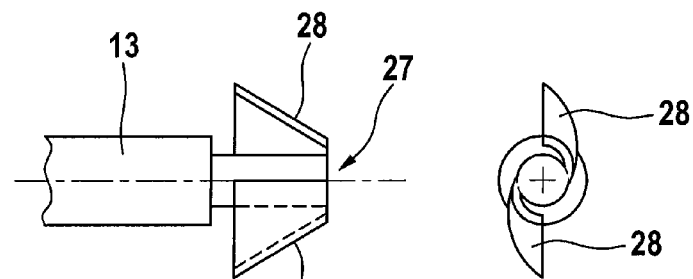
Fig. 5  Fig. 6

ASSEMBLY MADE OF A COMPENSATING TANK AND A MASTER CYLINDER FOR A HYDRAULIC MOTOR VEHICLE BRAKE SYSTEM

CROSS REFERENCE TO RELATED APPLICATIONS

This application is the U.S. National Phase Application of PCT International Application No. PCT/EP2010/059349, filed Jul. 1, 2010, which claims priority to German Patent Application No. 10 2009 034 626.0, filed Jul. 27, 2009, the contents of such applications being incorporated by reference herein.

FIELD OF THE INVENTION

The invention relates to an assembly comprising a compensating reservoir and a master cylinder for a hydraulic motor vehicle brake system, wherein the compensating reservoir has two fastening lugs, each with an opening, wherein the openings are in alignment with an opening in the master cylinder, and the compensating reservoir is fastened by way of a releasable connection by means of a fastening pin, which extends through the aligned openings.

BACKGROUND OF THE INVENTION

An assembly of this kind is known from DE 100 47 325 A1, which is incorporated by reference, for example. The fastening pin known therefrom is provided as an angled pin and has a nose which can be locked in spring strips connected to the fastening lug. The angled pin provided is generally made from stainless steel. Removal from the fastening lugs is accomplished with the aid of a tool, and this is regarded as disadvantageous, especially in view of the ever decreasing amount of installation space for the assembly in the engine compartment. Moreover, the expensive production of the spring strips is regarded as disadvantageous. At the same time, there is the requirement for vehicle components that are optimized in terms of weight.

Other ways of fastening the compensating reservoir envisage connecting the compensating reservoir to the master cylinder by means of screws. For this purpose, expensive production of a thread in the master cylinder is required.

SUMMARY OF THE INVENTION

It is an aim of the invention to provide an assembly comprising a compensating reservoir and a master cylinder which is improved in these respects and, at the same time, has a design which is optimized in terms of weight.

According to aspects of the invention, is achieved by virtue of the fact that the fastening pin provided is made of plastic and interacts positively or nonpositively with at least one of the openings in the fastening lugs. As a result, the assembly can be designed for optimum weight while being simple to produce and can be assembled and partially disassembled without tools.

To simplify positioning during installation, the fastening pin preferably has a head flange at a first end for the purpose of resting against one of the fastening lugs. It is particularly advantageous here if, where possible, the fastening pin and the fastening lugs are designed in such a way that installation can take place from both sides, i.e. from both fastening lugs.

The fastening pin preferably has one or more latching elements, which interacts positively with at least one of the openings. It is advantageous that the latching elements can be provided in a simple manner during the production of the fastening pin. Additional machining is generally unnecessary.

An advantageous embodiment of the invention envisages that the openings in the fastening lugs each have a recess on an inner side, into which recess one or more latching noses on the fastening pin engage after the installation thereof.

Another advantageous embodiment envisages that the fastening pin has, at the second end thereof, one or more resilient latching arms, which engage on one of the fastening lugs after its installation.

It is advantageous here if the latching arms are designed in such a way that they are pressed together resiliently during installation and removal.

In another advantageous embodiment, provision is furthermore made for the fastening pin to have resilient spiral latching elements at its second end.

In order to prevent rattling of the fastening pin in the opening in the master cylinder, provision can preferably be made for the fastening pin to have means for wedging in the opening in the master cylinder in a central section.

An advantageous embodiment envisages that the fastening pin is provided with a convexity in the central section and has an axially oriented slot.

Another advantageous embodiment of the invention envisages that the fastening pin has axially oriented projections in the central section.

A simple nonpositive connection between the fastening pin and a fastening lug can be achieved if the fastening pin has, at the second end thereof, a thread- or fir tree-shaped profile which can be wedged in the openings in the fastening lugs.

According to an advantageous embodiment, the fastening pin can alternatively have, at the second end thereof, a thread- or fir tree-shaped profile which interacts with a complementary profile in the openings in the fastening lugs.

The fastening pin provided is preferably made from a harder plastic than the compensating reservoir. It is thereby possible to ensure that the fastening pin is not damaged during its installation and during its possible removal.

An advantageous embodiment envisages that the fastening pin provided is made from glass-reinforced polyamide. However, other plastics materials can also be used within the scope of the invention.

The above aspect is furthermore achieved by virtue of the fact that the fastening pin has, at a first end, a head flange for the purpose of resting against one of the fastening lugs, and, on the head flange, has two resilient projections, which engage in recesses on an outer side of the fastening lugs after installation.

BRIEF DESCRIPTION OF THE DRAWINGS

The invention is best understood from the following detailed description when read in connection with the accompanying drawings. Included in the drawings is the following figures:

FIG. 1 shows a detail of an assembly according to aspects of the invention of a first illustrative embodiment comprising a compensating reservoir and a master cylinder;

FIG. 2 shows a detail of an assembly according to aspects of the invention of a second illustrative embodiment comprising a compensating reservoir and a master cylinder;

FIG. 3 shows a detail of an assembly according to aspects of the invention of a third illustrative embodiment comprising a compensating reservoir and a master cylinder;

FIG. 4 shows a detail of an assembly according to aspects of the invention of a fourth illustrative embodiment comprising a compensating reservoir and a master cylinder;

FIG. 5 shows a fastening pin of an assembly according to aspects of the invention of a fifth illustrative embodiment comprising a compensating reservoir and a master cylinder;

FIG. 6 shows the fastening pin according to FIG. 5 in a front view;

DETAILED DESCRIPTION OF THE PREFERRED EMBODIMENTS

Figure 7:
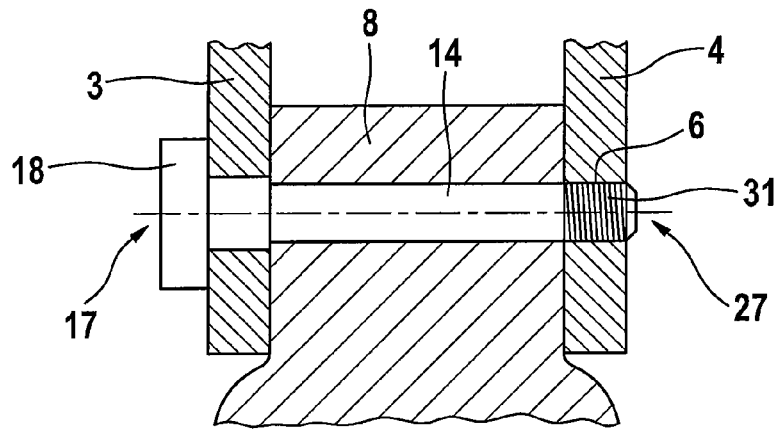
FIG. 7 shows a detail of an assembly according to aspects of the invention of a sixth illustrative embodiment comprising a compensating reservoir and a master cylinder.

FIGS. 1 to 10 show schematically illustrative embodiments of an assembly according to aspects of the invention comprising a compensating reservoir 1 and a master cylinder 2 for a hydraulic motor vehicle brake system, the construction and operation of which are fundamentally known. After the mounting of the compensating reservoir 1 on the master cylinder 2, connection stubs (not shown) of said reservoir are accommodated in corresponding connection openings of the master cylinder 2 and connect pressure medium chambers of the compensating reservoir 1 to pressure spaces of the master cylinder 2 in a known manner.

For releasable connection to the master cylinder 2, the compensating reservoir 1 has two fastening lugs 3, 4, each with an opening 5, 6. After the mounting of the compensating reservoir 1 on the master cylinder 2, these openings 5, 6 are in alignment with an opening 7 in the master cylinder 2. For fastening, a fastening pin 9, 10, 11, 12, 13, 14, 15, 16, 36 made of plastic is provided, which extends through the aligned openings 5, 6, 7. In the region of a master cylinder lug 8, the opening 7 in the master cylinder 2 is provided as a through hole, which extends between reservoir connections (not shown) of the master cylinder 2.

Common to all the illustrative embodiments described below is the fact that the fastening pin 9, 10, 11, 12, 13, 14, 15, 16, 36 provided is made from a harder plastic than the compensating reservoir 1. It is thereby possible to ensure that the fastening pin 9 to 16 is not damaged during its installation and during its possible removal. For example, the fastening pin 9 to 16, 36 provided can be made from glass-reinforced polyamide, although other plastics materials can also be used within the scope of the invention.

In order to simplify the installation of the fastening pin 9 to 16 and to make it possible without the aid of tools and to obtain an assembly which is optimized in terms of weight, the fastening pin 9 to 16, 36 provided in the respective illustrative embodiment is made of plastic and interacts positively or nonpositively with at least one of the openings 5, 6 in the fastening lugs 3, 4 and with the fastening lugs 3, 4.

To simplify positioning during installation, the fastening pin 9 to 16, 36 has a head flange 18, 38 at a first end 17, 37 for the purpose of resting against one of the fastening lugs 3, 4. It is particularly advantageous here if, where possible, the fastening pin 9 to 16, 36 and the fastening lugs 3, 4 are designed in such a way that installation can take place from both sides, i.e. from both fastening lugs 3, 4.

FIGS. 1 to 6 show five illustrative embodiments in which the fastening pin 9 to 13 has one or more latching elements, which interacts positively with at least one of the openings 5, 6 in the fastening lugs 3, 4. The latching elements can be provided in a simple manner during the production of the fastening pin 9 to 13, thereby making it possible to omit additional machining.

FIG. 1 shows a detail of an assembly according to aspects of the invention of a first illustrative embodiment. As can be seen, the openings 5, 6 in the fastening lugs 3, 4 each have a recess 19, 20 on an inner side, with the result that the openings 5, 6 are of stepped design, with a small diameter on an outer side and a large diameter on the inner side. The fastening pin 9 has a plurality of latching noses 21, which engage in the recess 19 after the installation thereof. The latching noses 21 are dimensioned in such a way that they can be deformed during installation through the opening 5.

Since both fastening lugs 3 and 4 each have a stepped opening 5, 6 with the same diameters, installation from both sides is possible.

FIGS. 2 to 4 show illustrative embodiments in which the fastening pins 10 to 12 have, at the second ends 27 thereof, one or more resilient latching arms 22 to 24, which can engage on the fastening lug 3, 4 after the installation of the fastening pins 10 to 12.

FIG. 2 shows a second embodiment. The fastening pin 10 has two latching arms 22, which are advantageously pressed together resiliently during installation and during removal. For this purpose, the latching arms 22 are arranged substantially in a U shape, and the latching arms 22 each have two guide bevels 25, 26. As is apparent from FIG. 2, the guide bevels 25 allow the latching arms 22 to be pressed together during the installation of the fastening pin 10, and the guide bevels 26 allow them to be pressed together during the removal thereof.

As can be seen from FIGS. 3 and 4, the latching arms 23, 24 of the third and fourth illustrative embodiments are dimensioned in such a way that the fastening pin 11, 12 does not have a larger diameter in the region of the latching arms 23, 24 if the latching arms 23, 24 are pressed together during installation. Owing to the design of the latching arms 23, 24, the fastening pins 11, 12 cannot be removed.

FIGS. 5 and 6 show a fifth illustrative embodiment, the fastening pin 13 of which has resilient spiral latching elements 28 at its second end 27, with a diameter of the end 27 being smaller than a diameter of the opening 7 in the master cylinder 2 in order to ensure simple installation of the fastening pin 13.

In order to prevent rattling of the fastening pins 9 to 13 of the illustrative embodiments under consideration in the opening 7 in the master cylinder 2, provision can be made in these for the fastening pins 9 to 13 to have means for wedging in the opening 7 in a central section 29. These means can be axially oriented projections 30, for example, as illustrated in FIG. 2.

As an alternative, the fastening pins 9 to 13 can be provided with a convexity, i.e. can be arched, in the central section 29. In this case, an axially oriented slot allows simple installation through the opening 7 in the master cylinder 2.

A sixth illustrative embodiment in accordance with FIG. 7 provides a nonpositive connection between the fastening pin 14 and a fastening lug 3, 4, which can be achieved in a simple manner if the fastening pin 14 has, at the second end 27 thereof, a thread- or fir tree-shaped profile 31 which can be wedged in the opening 5, 6.

Figure 8:
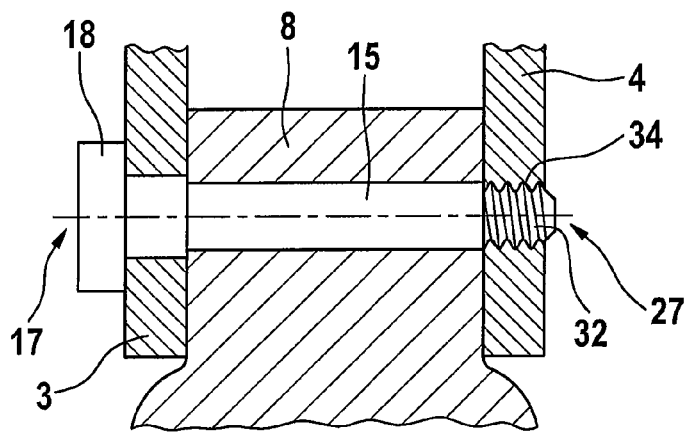
FIG. 8 shows a fastening pin of an assembly according to aspects of the invention of a seventh illustrative embodiment comprising a compensating reservoir and a master cylinder.
Figure 9:
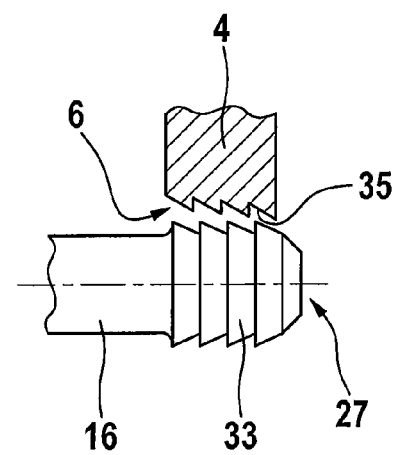
FIG. 9 shows a fastening pin of an assembly according to aspects of the invention of an eighth illustrative embodiment comprising a compensating reservoir and a master cylinder.

According to FIGS. 8 and 9, which show a seventh and eighth illustrative embodiment, the fastening pin 15, 16 can have, at the second end 27 thereof, a thread- or fir tree-shaped profile 32, 33 which interacts with a complementary profile 34, 35 in the opening 6 in the fastening lug 4.

Figure 10:
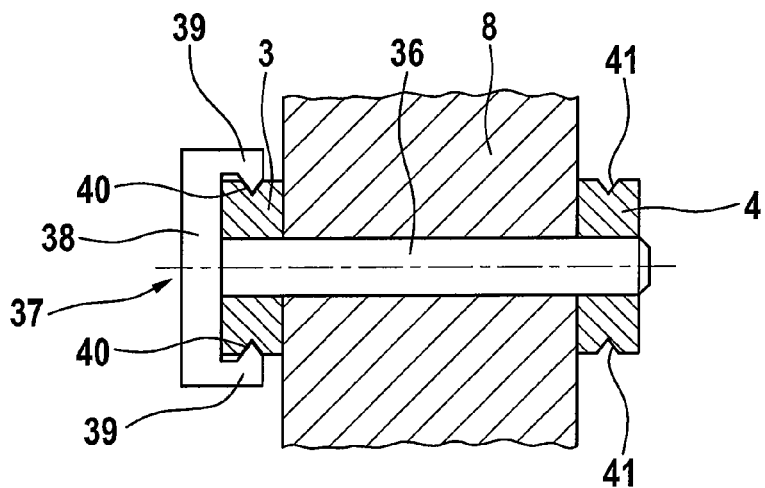
FIG. 10 shows a fastening pin of an assembly according to aspects of the invention of a ninth illustrative embodiment comprising a compensating reservoir and a master cylinder.

A ninth illustrative embodiment is shown in FIG. 10. The fastening pin 36 likewise has, at a first end 37, a head flange 38 for the purpose of resting against one of the fastening lugs 3, 4. In contrast to the illustrative embodiments described above, however, the head flange 38 has two resilient projections 39, which engage positively in recesses 40, 41 on an outer side of the fastening lugs 3, 4 after installation. Since the recesses 40, 41 are provided on both fastening lugs 3, 4, installation can take place from both sides.

Installation from both sides is advantageously possible if the openings 5, 6 have an identical diameter. For this purpose, the fastening pin 10 illustrated in FIG. 2 has a uniform diameter in the region of the openings 5, 6, for example. Stepping of the fastening pin 10, 11, 12, 14, 15, 16 after the head flange 18, as illustrated, is thus not absolutely essential.

LIST OF REFERENCE SIGNS

1 compensating reservoir
2 master cylinder
3 fastening lug
4 fastening lug
5 opening
6 opening
7 opening
8 master cylinder lug
9 fastening pin
10 fastening pin
11 fastening pin
12 fastening pin
13 fastening pin
14 fastening pin
15 fastening pin
16 fastening pin
17 end
18 head flange
19 recess
20 recess
21 latching nose
22 latching arm
23 latching arm
24 latching arm
25 guide bevel
26 guide bevel
27 end
28 latching element
29 section
30 projection
31 profile
32 profile
33 profile
34 profile
35 profile
36 fastening pin
37 end
38 head flange
39 projection
40 recess
41 recess

The invention claimed is:

1. An assembly comprising a compensating reservoir and a master cylinder for a hydraulic motor vehicle brake system, wherein the compensating reservoir has two fastening lugs, each with an opening, wherein the openings are in alignment with an opening in the master cylinder, and the compensating reservoir is fastened by way of a releasable connection by a fastening pin, which extends through the aligned openings, wherein the fastening pin is made of plastic and has a head flange at a first end for resting against one of the fastening lugs and, counter to an installation direction of the fastening pin, interacts with at least one of the openings in the fastening lugs, wherein the releasable connection is configured to be locked positively without the aid of tools and only by an axial plug-in movement of the fastening pin through the aligned openings.

2. The assembly as claimed in claim 1, wherein the fastening pin has one or more latching elements, which interacts positively with at least one of the openings.

3. The assembly as claimed in claim 2, wherein the openings in the fastening lugs each have a recess on an inner side, into which recess one or more latching noses on the fastening pin engage after the installation thereof.

4. The assembly as claimed in claim 2, wherein the fastening pin has, at the second end thereof, one or more resilient latching arms, which engage on one of the fastening lugs after its installation.

5. The assembly as claimed in claim 4, wherein the latching arms are designed in such a way that they are pressed together resiliently during installation and removal.

6. The assembly as claimed in claim 2, wherein the fastening pin has resilient spiral latching elements at its second end.

7. The assembly as claimed in claim 1, wherein the fastening pin comprises means for wedging in the opening in the master cylinder in a central section.

8. The assembly as claimed in claim 7, wherein the fastening pin is provided with a convexity and an axially oriented slot.

9. The assembly as claimed in claim 7, wherein the fastening pin has axially oriented projections in the central section.

10. The assembly as claimed in claim 1, wherein the fastening pin is made from a harder plastic than the compensating reservoir.

11. The assembly as claimed in claim 1, wherein the fastening pin is made from glass-reinforced polyamide.

12. The assembly as claimed in claim 1, wherein the fastening pin and the fastening lugs are configured such that fastening pin is configured to be initially inserted through the opening of a first fastening lug of the two fastening lugs and then through the opening of the second fastening lug of the two fastening lugs, and the fastening pin and the fastening lugs are further configured such that fastening pin is configured to be initially inserted through the opening of the second fastening lug and then through the opening of the first fastening lug.

13. An assembly comprising a compensating reservoir and a master cylinder for a hydraulic motor vehicle brake system, wherein the compensating reservoir has two fastening lugs, each with an opening, wherein the openings are in alignment with an opening in the master cylinder, and the compensating reservoir is fastened by way of a connection by a fastening pin, which extends through the aligned openings, wherein the fastening pin is made of plastic and has a head flange at a first end for resting against one of the fastening lugs and, counter to an installation direction of the fastening pin, interacts with at least one of the openings in the fastening lugs, wherein the connection is configured to be locked positively without the aid of tools and only by an axial plug-in movement of the fastening pin through the aligned openings, wherein the fastening pin has, at a second end thereof, a fir tree-shaped profile which interacts with a complementary profile in the openings in the fastening lugs.

14. The assembly as claimed in claim 13, wherein the fir tree-shaped profile can be wedged in the openings in the fastening lugs.

15. An assembly comprising a compensating reservoir and a master cylinder for a hydraulic motor vehicle brake system, wherein the compensating reservoir has two fastening lugs, each with an opening, wherein the openings are in alignment with an opening in the master cylinder, and the compensating reservoir is fastened by way of a releasable connection by a fastening pin, which extends through the aligned openings, wherein the fastening pin has, at a first end, a head flange for the purpose of resting against one of the fastening lugs, and, on the head flange, has two resilient projections, which engage in recesses on an outer side of the fastening lugs after installation.

\* \* \* \* \*